United States Patent [19]
Hums
[11] 4,119,470
[45] Oct. 10, 1978

[54] CERAMIC COMPOSITION FOR MAKING STONEWARE PRODUCTS

[75] Inventor: Dieter Hums, Schrobenhausen, Fed. Rep. of Germany
[73] Assignee: Intong AB, Kumla, Sweden

[21] Appl. No.: 703,605
[22] Filed: Jul. 8, 1976
[30] Foreign Application Priority Data
Jul. 29, 1975 [DE] Fed. Rep. of Germany ....... 2533774
[51] Int. Cl.[2] ....................... C04B 33/00; C04B 33/13
[52] U.S. Cl. .................................... 106/45; 106/71; 106/120
[58] Field of Search ............................ 106/45, 71, 120

[56] References Cited

U.S. PATENT DOCUMENTS

| | | | |
|---|---|---|---|
| 968,379 | 8/1910 | Marsden | 106/45 |
| 3,030,218 | 4/1962 | Robinson | 106/71 |
| 3,690,904 | 9/1972 | Spangler | 106/71 |

FOREIGN PATENT DOCUMENTS

| | | | |
|---|---|---|---|
| 168,178 | 2/1965 | U.S.S.R. | 106/45 |

*Primary Examiner*—O. R. Vertiz
*Assistant Examiner*—Mark Bell
*Attorney, Agent, or Firm*—Larson, Taylor and Hinds

[57] ABSTRACT

A ceramic composition capable of quick firing to form a stoneware product. The composition contains water, a clay component and a lime component. The clay component is a conventional stoneware clay. The lime component is a hydrothermally cured, highly porous lime-sand product having a major proportion of spherical pores. The lime-sand product can be a conventional lightweight cellular concrete product having a density of 0.4 to 0.8 g/cm$^3$ and is preferably waste product resulting from the manufacture of lightweight concrete products. The composition is made by grinding the clay and lime-sand product, forming an aqueous slurry of the ground material, drying the slurry, and granulating the dried material. The granulated composition is utilized by pressing to shape, drying, and firing at a temperature of 900° to 1100° C for not more than 6 hours. The material is also suitable for conventional firing schedules.

24 Claims, No Drawings

CERAMIC COMPOSITION FOR MAKING STONEWARE PRODUCTS

BACKGROUND OF THE INVENTION

The present invention relates to a ceramic composition which is particularly well suited for quick firing, consisting mainly of a lime component, a clay component, and water, and a method for manufacturing the ceramic compound and its utilization for manufacturing stoneware products.

Various kinds of stoneware compositions for lime or feldspar stoneware are produced in large quantities for the manufacturing of ceramic products, especially wall tiles and crockery. Clays, quartz powder, calcareous spars and fluxing materials such as feldspars, syenites etc. are generally used as main raw materials. These stoneware compounds are fired at temperatures of approximately 1000°-1100° C. They must be heated slowly and fired over a long period of time. A common firing period is about 24 hours.

To reduce the long firing periods, many attempts have been made during the last few years within the ceramic industry to develop a composition suitable for quick firing. In the wall tile industry in America, compositions which are suitable for quick firing are manufactured on the basis of clay-wollastonite or clay-talc-dolomite. In Germany, and also in Middle Europe, such compositions are not utilized, as no suitable raw materials are available, i.e. there are no local deposits of wollastonite and talc. Attempts have been made to synthesize wollastonite or other calcium silicates (e.g. diopside) and use these as raw materials in the ceramic industry. The types of compositions manufactured by synthetic wollastonite have very good qualities with regard to quick firing. Within the wall tile industry, however, wollastonite has not been used as a raw material in quantities worth mentioning, as wollastonite is too expensive for such use.

It is an object of the present invention to provide a ceramic composition especially suitable for quick firing and for manufacturing stoneware, using a cheap raw material.

It is a further object of the invention to provide a method of making such ceramic composition and yet a further object is to provide a method of making stoneware therefrom.

BRIEF SUMMARY OF THE INVENTION

The foregoing and other objects which will be apparent to those having ordinary skill in the art are achieved in accordance with the present invention by providing a ceramic composition, a major proportion of which is constituted by a lime component, a clay component, and water, in which the lime component is a hydrothermally cured, highly porous lime-sand product having a major proportion of spherical pores. The composition is prepared by grinding together a conventional stoneware clay and the lime-sand product, forming an aqueous castable slurry of the ground material, drying the slurry and granulating the dried material. Stoneware is made by pressing the composition into a desired shape, drying, and then firing at temperatures of 900° to 1100° C. The composition can be quickly fired in not more than six hours, without the adverse effects resulting from attempts to quickly fire conventional inexpensive stoneware compositions.

DETAILED DESCRIPTION

The lime component is a product, made mainly of a mixture of lime, cement, quartz sand, water and expanding or foaming agents. In a conventional process, cement and quartz sand are thoroughly mixed batchwise in a mixer, adding water and expanding or foaming agent. Degreased aluminium powder, hydrogen peroxide, chloride of lime, or the like, can be used as a gas developing expanding agent. The mixture is cast in a mould and gas is immediately evolved by the gas producing agent which forms the porous structure. At the same time, chemical binding of the lime and silicate material begins. The mass sets to "green" strength in about 1 hour. After being divided into building units or the like, the material is subjected to hydrothermal curing. A typical cure is 8-10 hours at 180° C. at a pressure of about 10 Kg/cm$^2$.

The following mixture is an example of a material very well suited for the preparation of the lime component of the present invention (all amounts given on a dry weight basis):

15-35% by weight of burnt lime
3-15% by weight of cement
55-85% by weight of quartz sand of a grain size of 90% by weight less 90 $\mu$m.

The most favorable mixture contains (dry weight basis):

20% by weight of burnt lime
5% by weight of Portland cement
75% by weight of quartz sand of a grain size of 90% by weight less 90 $\mu$m.

In general, the cured lime component has a volume weight of approximately 0.4-0.8 g/cm$^3$ and a porosity of approximately 60-90%, the main part of the pores being spherical. It is mainly built up of quartz grains, puttied together in a binding agent structure of calcium silicate hydrates, wherein the portion of quartz grains may amount to about 60-80% by weight. Such products are per se known as form products and are known as cellular concrete or other terms such as gas concrete, lightweight concrete and foam concrete. Their chemical composition is approximately the following:

| | |
|---|---|
| $SiO_2$ | 50-55 % by weight |
| CaO | 20-25 % by weight |
| $Fe_2O_3$ | 0.5-1.5 % by weight |
| $Al_2O_3$ | 3-8 % by weight |
| MgO | 2-3 % by weight |
| loss on ignition | 15-20 % by weight |

The ceramic composition in accordance with the invention contains ordinary commercial stoneware clays and the lime component described above in a ratio of components by weight clay substance:lime component of 95:5 to 40:60, preferably between 75:25 and 50:50. In addition to these ingredients, the composition contains about 4-8%, preferably about 6%, by weight of water and, optionally, conventional fluxing agents for ceramics, such as feldspar, preferably in amounts of 2-10% by weight.

To prepare the ceramic composition in accordance with the invention, ordinary commercial stoneware clays are ground, adding about 30% by weight of water with the lime component, preferably in a ceramic ball mill, to avoid ferruginous contamination, until a ceramic slurry, suitable for casting, has formed. If required, conventional fluxing materials such as feldspars, can also be ground in, in quantities of about 2–10% by weight. Grinding agents, preferably in quantities between 0.1 and 0.7% by weight, may also be added. As grinding agents, preferably conventional materials containing water glass or soda are used. The slurry is then dried to a moisture content of about 6% by weight, preferably by spray drying, and the resulting compound is granulated.

The granulated ceramic compound in accordance with the invention is pressed into blanks of desired shape. The blanks are dried in the usual way and acquire a very good green strength. The material is particularly well suited for glazing, due to its favorable pore structure. They are preferably fired by a quick firing process at temperatures of 900°–1100° C., preferably 1000°–1050° C., whereby the firing cycle is carried out in 1–6 hours, preferably 2–4 hours. The blanks which have been pressed out of the ceramic composition in accordance with the invention are, of course, suitable for longer firing schedules such as the conventional 24 hour schedule mentioned above.

EXAMPLE

100 Kg of stoneware clay is dispersed with 60 Kg water in a ceramic ball mill. 1 Kg of alkali polyphosphate grinding agent (Formsil AP, trade name, produced by Henkel International) is also mixed into the aqueous dispersion. The dispersion is ground, non-ferruginously, with 100 Kg cellular concrete waste in a ceramic ball mill for 2 hours. The slurry thus obtained is dried with hot air to a moisture content of 6% by weight of water, granulated, and pressed into a blank in a wall tile press. The blank is dried in a drying tunnel at 110° C. and fired in a through-oven for 2 hours at 1000° C.

The fired product is cream-colored and has a bending strength of 180 Kg/cm$^2$. A glazing is applied, which is fired in at 950° C. The adherence of the glazing as well as the lustre and evenness are perfect. An autoclave test shows that the product is stable as to form against the influence of moisture.

The fired product has a very good bending strength, in all cases corresponding to the values required in accordance with DIN 18155. The shrinkage is quite low, less than 1%. Furthermore, the product has a very light color, cream-colored to light-brown. A substantial advantage of products made of the ceramic composition of the invention is that they hardly have any moisture dilatation at all, and therefore do not cause any capillary cracks in the glazing.

The raw material costs for the ceramic composition of the invention are quite low in comparison with known calcium silicates, due to the utilization of the particular lime component. It should especially be pointed out that, e.g., waste material which is had in large quantities when manufacturing cellular concrete, or cellular concrete products which cannot be disposed of within the building sector, may be used as a cheap lime component. Since in the cellular concrete manufacture, great importance is normally attached to the uniformity in the composition of the raw material mixture, the composition of the cured products useful in the present invention is subject only to small variations. Due to this uniformity those products are especially suitable to be used for preparing a ceramic composition, even where the products are regarded as waste material in the building sector.

The utilization of the very porous lime component is not at all suggested in the prior art. On the contrary, this component is, e.g., also porous in its most fine-grained constituents so that it could be expected that the structure should partly only deform elastically at pressing, and the blank be loosened after pressing, by the elastic after-effects on the structure. This phenomenon is, for instance, well known with the use of mica. Evidently, however, small particles of clay penetrate the pores of the lime component and support the structure at the pressing in such a way that no perceivable elastic deformation occurs.

Further, it could have been expected that the relatively light lime component would float up during grinding and prevent a homogeneous mixing and grinding. However, it has shown that no grinding problems arise. Presumably this is also due to the fact that small particles of clay can penetrate the pore structure and make the grains of the lime component heavier, so that no separation occurs in the grinder. It is also known that calcium silicate phases give rise to important fluidizing problems. These problems were not observed by applicant, nor did bad drying conditions for the shaped bodies occur, which could have been expected on account of the capillar porosity of the calcium silicate hydrate phases.

The utilization of the hydrothermally cured lime component in a ceramic compound is advantageous for ceramic firing, especially since the calcium silicate hydrate phases as well as the quartz grains, which are superficially dissolved during the hydrothermal process, and further the clay substances all have a high activating energy at temperatures of 500°–600° C. so that reactions in solid phase are facilitated and thus any possible sintering agents are not required. The consequence of this will be reactions of high velocity in solid phase and therefore very short firing periods are possible. Thus, fired products with particularly high strength and — contrary to known stoneware products — with a surprisingly good glazing affinity, are obtained from the ceramic composition of the invention. Therefore, very good firing results with regard to lustre and evenness can be obtained with practically any conventional glazing.

What is claimed is:

1. A ceramic composition suitable for quick firing to form a stoneware product which composition consists essentially of about 4 to 8% by weight water, a lime component and a clay component in a weight ratio of clay component to lime component of 95:5 to 40:60, said lime component consisting essentially of a hydrothermally cured, highly porous lime-sand product comprised mainly of quartz grains bound together with a binder comprising calcium silicate hydrates, said lime component being obtained by grinding a hydrothermally cured, highly porous, lightweight, lime-sand product having a major proportion of spherical pores.

2. An improved ceramic composition according to claim 1 wherein said lime-sand product has a specific gravity of from 0.4 to 0.8 g/cm$^3$.

3. An improved ceramic composition according to claim 1 in which said lime-sand product has the following composition:

| | |
|---|---|
| $SiO_2$ | 50–55 % by weight |
| CaO | 20–25 % by weight |
| $Fe_2O_3$ | 0.5–1.5 % by weight |
| $Al_2O_3$ | 3–8 % by weight |
| MgO | 2–3 % by weight |
| loss on ignition | 15–20 % by weight |

4. An improved ceramic composition according to claim 1 in which said lime-sand product comprises cellular concrete.

5. An improved ceramic composition according to claim 4 in which said cellular concrete is waste product resulting from the manufacture of cellular concrete products.

6. An improved ceramic composition according to claim 1 wherein said weight ratio is from 75:25 to 50:50.

7. An improved ceramic composition according to claim 1 which further comprises a ceramic fluxing agent in an amount of 2 to 10% by weight.

8. An improved ceramic composition according to claim 7 wherein said ceramic fluxing agent comprises feldspar.

9. A method of making a ceramic composition suitable for quick firing to form a stoneware product comprising the steps of grinding stoneware clay and a hydrothermally cured, highly porous lime-sand product having a major proportion of spherical pores, forming an aqueous castable slurry consisting essentially of ground clay and lime-sand product in a weight ratio of said clay to said lime-sand product of 95:5 to 40:60, said lime-sand product consisting essentially of a hydrothermally cured, highly porous lime-sand product comprised mainly of quartz grains bound together with a binder comprising calcium silicate hydrates, drying the slurry to form a solid, granulatable, product, and granulating the solid product to form a ceramic composition suitable for quick firing to form a stoneware product.

10. A method according to claim 9 wherein said lime-sand product has a specific gravity of 0.4 to 0.8 g/cm$^3$ and a porosity of 60 to 90%.

11. A method according to claim 10 wherein said lime-sand product has the following composition:

| | |
|---|---|
| $SiO_2$ | 50–55 % by weight |
| CaO | 20–25 % by weight |
| $Fe_2O_3$ | 0.5–1.5 % by weight |
| $Al_2O_3$ | 3–8 % by weight |
| MgO | 2–3 % by weight |
| loss on ignition | 15–20 % by weight |

12. A method according to claim 9 wherein the grinding step is effected in the presence of a ceramic fluxing agent.

13. A method according to claim 9 wherein the grinding step is effected in a manner to avoid ferruginous contamination.

14. In a method of making a ceramic stoneware article in which a granular ceramic composition consisting essentially of about 4 to 8% by weight water, clay, and a lime-sand product in a weight ratio of said clay to said lime-sand product of 95:5 to 40:60 is pressed into a desired shape, dried, and then quickly fired at a temperature of from 900° to 1100° C. for not more than 6 hours to form a ceramic stoneware article the improvement wherein said lime-sand product consists essentially of a hydrothermally cured, highly lightweight, porous lime-sand product comprised mainly of quartz grains bound together with a binder comprising calcium silicate hydrates, said lime component being obtained by grinding a hydrothermally cured, highly porous, lightweight, lime-sand product having a major proportion of spherical pores.

15. An improved method according to claim 14 wherein said lime-sand product has a specific gravity of from 0.4 to 0.8 g/cm$^3$ and a porosity of 60 to 90%.

16. An improved method according to claim 14 wherein said lime-sand product has the following composition:

| | |
|---|---|
| $SiO_2$ | 50–55 % by weight |
| CaO | 20–25 % by weight |
| $Fe_2O_3$ | 0.5–1.5 % by weight |
| $Al_2O_3$ | 3–8 % by weight |
| MgO | 2–3 % by weight |
| loss on ignition | 15–20 % by weight |

17. An improved method according to claim 14 wherein said lime-sand product comprises lightweight concrete waste product resulting from the manufacture of lightweight concrete products.

18. An improved method according to claim 14 in which the shaped ceramic composition is fired at a temperature of from 1000°–1050° C.

19. An improved method according to claim 14 in which the shaped ceramic composition is fired for from 1 to 6 hours.

20. An improved method according to claim 14 in which the shaped ceramic composition is fired for from 2 to 4 hours.

21. An aqueous castable slurry for use in the formation of a ceramic composition suitable for quick firing to form a stoneware product consisting essentially of a slurry of a lime component and a clay component in water, the weight ratio of the clay component to the lime component being 95:5 to 40:60 and said lime component consisting essentially of a hydrothermally cured, hight porous lime-sand product comprising quartz grains bound together with a binder comprising calcium silicate hydrates, said lime component being obtained by grinding a hydrothermally cured, highly porous, lightweight, lime-sand product having a major proportion of spherical pores.

22. An improved ceramic composition according to claim 1 wherein said lime component comprises $SiO_2$, CaO, $Fe_2O_3$, $Al_2O_3$ and MgO.

23. A method according to claim 9 wherein said lime-sand product comprises $SiO_2$, CaO, $Fe_2O_3$, $Al_2O_3$ and MgO.

24. An improved method according to claim 14 wherein said lime component comprises $SiO_2$, CaO, $Fe_2O_3$, $Al_2O_3$ and MgO.

* * * * *